United States Patent
Baehr-Jones et al.

(10) Patent No.: US 10,133,014 B2
(45) Date of Patent: Nov. 20, 2018

(54) CONTROLLING BACK SCATTERING IN OPTICAL WAVEGUIDE SYSTEMS

(71) Applicant: Elenion Technologies, LLC, New York, NY (US)

(72) Inventors: Thomas Wetteland Baehr-Jones, Arcadia, CA (US); Matthew Akio Streshinsky, New York, NY (US); Yang Liu, Elmhurst, NY (US); Michael J. Hochberg, New York, NY (US); Ran Ding, New York, NY (US); Alexei Tager, Ottawa (CA)

(73) Assignee: Elenion Technologies, LLC, New York, NY (US)

( * ) Notice: Subject to any disclaimer, the term of this patent is extended or adjusted under 35 U.S.C. 154(b) by 0 days.

(21) Appl. No.: 15/481,971

(22) Filed: Apr. 7, 2017

(65) Prior Publication Data

US 2018/0292680 A1    Oct. 11, 2018

(51) Int. Cl.
| | |
|---|---|
| *G02B 6/42* | (2006.01) |
| *G02F 1/01* | (2006.01) |
| *G02B 6/125* | (2006.01) |
| *G02B 6/12* | (2006.01) |

(52) U.S. Cl.
CPC ........... *G02B 6/4207* (2013.01); *G02B 6/125* (2013.01); *G02F 1/011* (2013.01); *G02F 1/0147* (2013.01); *G02B 2006/12142* (2013.01); *G02F 2201/38* (2013.01); *G02F 2201/58* (2013.01); *G02F 2203/50* (2013.01)

(58) Field of Classification Search
None
See application file for complete search history.

(56) References Cited

U.S. PATENT DOCUMENTS

| | | | | |
|---|---|---|---|---|
| 4,637,722 | A * | 1/1987 | Kim | G01C 19/726 356/464 |
| 6,711,309 | B1 * | 3/2004 | Gan | G02B 6/264 359/278 |
| 9,823,496 | B1 * | 11/2017 | Doerr | G02F 1/01708 |
| 2001/0019642 | A1 * | 9/2001 | Krummrich | G02B 6/26 385/27 |
| 2005/0185685 | A1 * | 8/2005 | Chapman | G11C 5/147 372/32 |
| 2013/0222811 | A1 * | 8/2013 | Handerek | G01M 11/3127 356/477 |
| 2015/0377603 | A1 * | 12/2015 | Jia | G01D 5/35306 385/1 |

FOREIGN PATENT DOCUMENTS

JP    2005-332986 A   * 12/2005

* cited by examiner

*Primary Examiner* — Mike Stahl
(74) *Attorney, Agent, or Firm* — Nixon Peabody LLP

(57) ABSTRACT

Back scattering in an optical waveguide at an operating wavelength is controlled by adjusting an optical phase of light propagating in the waveguide at one or more locations along the waveguide. A portion of the back scattered light is tapped off near an input port and coupled into a photodetector. A controller detects changes in the photodetector signal and adjusts an optical phase tuner configured to control the optical phase of light in the waveguide at the selected location or locations. The optical phase tuner may be configured to vary the refractive index of at least a portion of the waveguide.

19 Claims, 15 Drawing Sheets

CONTROLLING BACK SCATTERING IN OPTICAL WAVEGUIDE SYSTEMS

FIELD OF THE INVENTION

The invention generally relates to photonic integrated circuits, and more particularly relates to an apparatus and method for an automated control of back scattering in optical waveguides.

BACKGROUND OF THE INVENTION

Rayleigh scattering from small defects and material non-uniformities in an optical waveguide can lead to significant amounts of optical back reflection, when part of the light propagating in the waveguide is reflected and propagates back towards the input. This back scattering may be particularly significant in high index contrast waveguide systems, where the surface roughness of the waveguide core may scatter light with a higher efficiency. Optical systems built in high index contrast material systems, such as for example silicon-on-isolator (SOI), can have relatively long waveguides and thus exhibit high levels back scattering. This back scattering may be a problem for other components in an optical system, such as for example laser diodes and erbium doped fiber amplifiers (EDFA), for which back reflected light may cause linewidth broadening and/or output power oscillations.

It is often difficult to reduce back scattering through changes in the waveguide fabrication process that improve the surface roughness of waveguides. Thus, a technique that can effectively reduce undesired back reflection in optical waveguide systems and devices with conventional waveguides to an acceptable level without appreciably affecting optical signal quality may be preferred.

Back reflections from a waveguide may be suppressed for example using optical isolators. However, a typical optical isolator is a relatively big component and its use may require additional optical splices/connections. Optical isolators may also require exotic materials, and typically require lenses. All these factors may significantly increase the size and cost of the system.

Back reflections may also be reduced by utilizing specific waveguide modes or by changing the waveguide geometry to reduce sensitivity to the surface roughness. However this does not typically provide sufficient improvement in back scattering, and may impose additional design trade-offs.

Accordingly, it may be understood that there may be significant problems and shortcomings associated with current solutions and technologies for controlling back reflections in optical waveguide systems.

SUMMARY OF THE INVENTION

Accordingly, one aspect of the present disclosure relates to a method for controlling back scattering in an optical waveguide system comprising at least one optical waveguide having an input port, said at least one optical waveguide defining an optical waveguide path for light injected in the input optical port. The method may comprise:

a) injecting input light into the input port of the at least one optical waveguide, the input light partially converting into backscattered light as the input light propagates away from the input port in the at least one optical waveguide, the back scattered light propagating towards the input port;

b) tapping off a portion of the back scattered light to form first tapped-off light;

c) coupling the first tapped-off light into a first photodetector (PD);

d) measuring a first electrical PD signal from the first PD, said first electrical PD signal being responsive to the first tapped-off light received by the first PD; and, e) acting upon the at least one waveguide so as to vary an optical phase of the backscattered light at one or more waveguide locations along the at least one optical waveguide in dependence upon the first electrical PD signal from the first PD, or a signal derived at least in part therefrom, so as to control an optical power of the tapped off portion of the backscattered light.

In some implementations the method may comprises tapping off the portion of the back scattered light to form first tapped-off light at or near the input port, and varying the optical phase of the backscattered light in dependence at least in part upon the first electrical PD signal so as to decrease, or at least stabilize, the optical power of the backscattered light at the input port.

One aspect of the present disclosure provides an optical waveguide system comprising: an input port configured to receive input light; at least one optical waveguide disposed to guide the input light from the input port along an optical waveguide path, the input light being partially converted into backscattered light while propagating in the at least one optical waveguide, the back scattered light propagating towards the input port; a first photodetector (PD) configured to provide a first electrical PD signal responsive to light received by the first PD; a coupler disposed to tap off a portion of the backscattered light at or near the input port and configured to couple said portion into the first PD; and, at least one optical phase tuner configured to act upon the at least one optical waveguide so as to vary an optical phase of light propagating therein at one or more locations along the at least one optical waveguide in response to one or more electrical control signals, so as to control an optical power of the tapped off portion of the backscattered light.

In accordance with an aspect of the present disclosure, the apparatus may include a controller electrically connected to the first PD and the optical phase tuner and configured to adjust the one or more electrical control signals so as to minimize or at least decrease the first electrical PD signal or a signal derived at least in part therefrom.

The apparatus may further include a second PD coupled to the at least one optical waveguide to receive a portion of the input light, and to generate a second PD signal responsive thereto, and the controller may be configure to measure changes in an optical return loss of the at least one optical waveguide based on the first and second electrical PD signals, and to adjust the one or more electrical control signals so as to minimize or at least decrease the optical return loss.

One aspect of the present disclosure provides a method for controlling back scattering in an optical waveguide system comprising at least one optical waveguide having an input port, the method comprising: a) injecting input light into the input port of the at least one optical waveguide, the input light partially converting into backscattered light as the input light propagates away from the input port in the at least one optical waveguide, the back scattered light propagating towards the input port; b) acting upon the at least one waveguide so as to dither an optical phase of the backscattered light at one or more locations along the at least one optical waveguide with a dither amplitude that is sufficient to maintain a time-averaged optical power of the backscattered light at the output port at a substantially constant level within an operating temperature range of the optical waveguide system. In some implementations the method may include locally modulating the optical phase of the back-scattered light at a location along the optical waveguide that is selected so as to enable at least 3 dB variation of an instantaneous optical power of the back-scattered light by the modulating.

BRIEF DESCRIPTION OF THE DRAWINGS

Embodiments disclosed herein will be described in greater detail with reference to the accompanying drawings, which may be not to scale and in which like elements are indicated with like reference numerals, and wherein.

DETAILED DESCRIPTION OF THE INVENTION

Figure 1A:
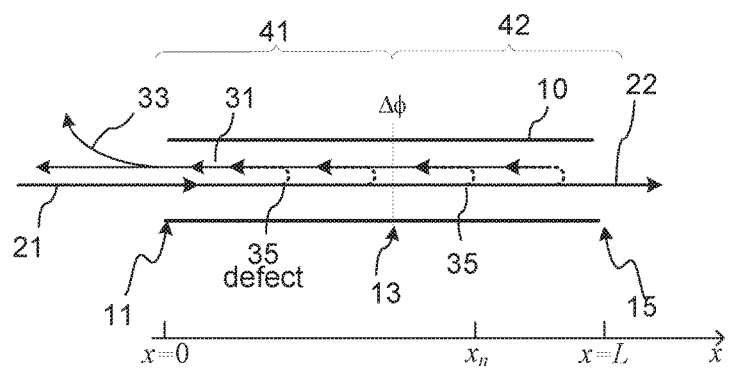
FIG. 1A is a schematic diagram of an optical waveguide illustrating forward and back scattered light and an optical phase shift at a middle point.

In the following description, for purposes of explanation and not limitation, specific details are set forth, such as particular optical circuits, circuit components, techniques, etc. in order to provide a thorough understanding of the present invention. However, it will be apparent to one skilled in the art that the present invention may be practiced in other embodiments that depart from these specific details. In other instances, detailed descriptions of well-known methods, devices, and circuits are omitted so as not to obscure the description of the present invention. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Furthermore, the following abbreviations and acronyms may be used in the present document:
CMOS Complementary Metal-Oxide-Semiconductor
GaAs Gallium Arsenide
InP Indium Phosphide
$LiNO_3$ Lithium Niobate
PIC Photonic Integrated Circuits
SOI Silicon on Insulator
PLC Planar Lightwave Circuit Note that as used herein, the terms "first", "second" and so forth are not intended to imply sequential ordering, but rather are intended to distinguish one element from another, unless explicitly stated. Similarly, sequential ordering of method steps does not imply a sequential order of their execution, unless explicitly stated. The word 'using', when used in relation to a method or process performed by an optical element, device, or sub-system, is to be understood as referring to an action performed by the respective optical element, device, or sub-system itself, or by a component thereof, and/or possibly by a controller included in the system, rather than by an external agent. The term "optical waveguide" may refer to planar and non-planar optical waveguides, and encompasses branching optical waveguides, such as but not exclusively those forming Mach-Zehnder waveguide structures and array waveguide gratings, and optical waveguides incorporating functional elements such as splitters, combiners, filters, waveguide amplifiers, waveguide modulators, etc. Furthermore the term 'optical waveguide', as used herein, may encompass a waveguide path that spans two or more chips, or comprised of two or more waveguide sections coupled using bulk coupling optics, irrespective of a type of optical coupling between the chips or waveguide sections. The term "p/n junction" includes p/i/n junctions having an intrinsic region between p-doped and n-doped rejoin. The term "planar waveguide" refers to a waveguide formed upon a planar substrate, and encompasses waveguides with lateral optical confinement in the plane of the substrate, such as for example ridge waveguides. The terms "light" and "optical" are used herein to refer to any electromagnetic radiation having a wavelength from the deep ultraviolet to the far infra-red. In fact, it will be appreciate that the present invention could be implemented for use with almost any wavelength of radiation; for example microwave or x-ray radiation.

One aspect of the present disclosure relates to an optical waveguide system that includes one or more optical waveguides which internal non-idealities lead to a level of back reflection that may be significant, and typically harmful, for the overall system performance. Examples include waveguide systems in the form of a single PLC chip, a sequence of PLC chips, or a system combining one or more PLC chips and optical fibers, and generally optical waveguides and waveguide systems with multiple reflection points spread along the waveguide path. Optical waveguides to which the description hereinbelow pertains may be single-mode or multi-mode, including waveguide paths which are composed of single-mode waveguides followed by multi-mode waveguides, or vice versa. It will be appreciated that the terms "single-mode" and "multi-mode" refer to the number of guided modes of electromagnetic radiation supported by the waveguide in the operating wavelength range of the optical waveguide system being described. The reflection points may be due to Raleigh scattering associated with the surface roughness of the waveguide, other distributed waveguide defects or fluctuation of material properties, or may be in the form of a sequence of connections between various waveguide devices, sections, or chips. In the context of the present disclosure, all such distributed back reflections will be referred to as optical back scattering.

With reference to FIG. 1A, there is schematically illustrated an optical waveguide 10 with an input end 11 and an output end 15, which receives input light 21 in its input end 11. The optical waveguide 10, which may be either single-mode or multi-mode, includes a plurality of scattering defects 41 that scatter small fractions of the input light back towards the input end 11, forming backscattered light 31 wherein light scattered from all these defects is added together. When the input light 21 has a coherence length that exceeds the length of the waveguide, the scattered light portions in each waveguide mode are added coherently, and the optical field $E_r$ of the backscattered light 31 at the input end 11 of the waveguide 10 can be expressed as $$E_r = \Sigma(A_n * R_n * B_n * \exp(2i\phi_n)) \quad (1)$$

where $A_n$ denotes an amplitude of the incident optical field at n-th scattering center, $B_n$ denotes the optical loss of the back-scattered light between the scattering center and a point at which the backscattered light is being measured, $R_n$ is a reflectivity of n-th scattering center, and $\phi_n$ is an optical phase delay of the input light at the n-th scattering center. The effects related to a finite coherence length of the input light may be accounted for by including a randomly fluctuating additive phase in $\phi_n$. The summation index in the right hand side (RHS) of equation (1) is n, i.e., the summation is performed over all scattering centers. Equation (1) directly relates to a single-mode waveguide, while for multi-mode waveguides it may be viewed as describing backscattering in each of the guided modes of the waveguide, with the parameters $A_n$, $B_n$, $R_n$ and $\phi_n$ being generally mode-dependent.

Figure 1B:
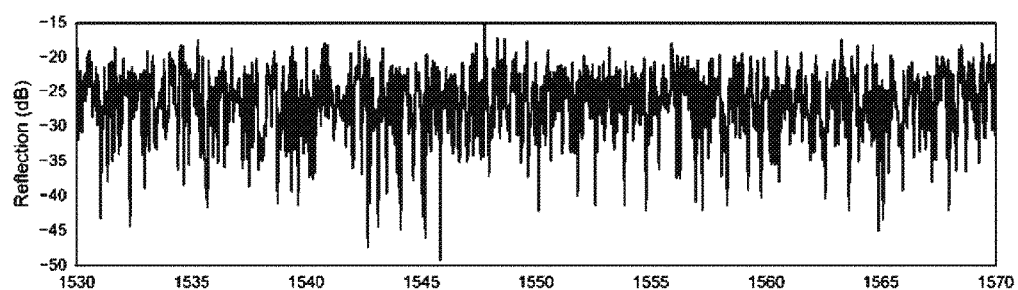
FIG. 1B is a plot of an example waveguide backscattering spectrum.

With reference to FIG. 1B, there is illustrated an example simulated spectrum of the optical power $P_r = |E_r|^2$ of the backscattered light in a single-mode SOI waveguide with the following parameters: the length of the waveguide L=0.5 cm, linear optical loss in the waveguide=2 dB/cm, a plurality of scattering centers whose reflection magnitude is normally-distributed with a standard deviation σ=0.002, and the total number of scattering centers or defects in the waveguide N=1000. The defects are assumed to be evenly distributed along the waveguide, which typically holds for Raleigh scattering on refractive index fluctuations and core surface roughness.

As can be seen from FIG. 1B, the back reflection power varies significantly across the spectrum, with deep troughs where the back reflected power may drop by as much as 20 dB and even more. Most communication systems operate at one specific operating wavelength or a few specific operating wavelengths. Thus, the back reflection are significantly reduced if the operating wavelength or wavelengths of interest coincides with one of the deep troughs or minima of the back scattering spectrum where the back-reflected signal is weak, or equivalently by shifting one of the deeper minima of the back-reflected spectrum to match the wavelength or wavelengths of interest present in the input light.

One way to modify or shift the spectrum of the back scattered light at the waveguide's input end 11 is to adjust an optical phase of the backscattered light at one or more middle points in the waveguide, or along at least a middle portion of the waveguide. FIG. 1A illustrates by way of example a middle point or cross-section 13 in the waveguide 10 where the optical phase of the backscattered light may be adjusted, for example by varying the effective refraction index of a length of the waveguide at the corresponding location, or by inserting at that location a tunable phase shifter. The wording "middle point," "middle location," or "middle portion" of a waveguide does not necessarily refer to an exact or even approximate center of the waveguide along its length, but is used to indicate that said point, location, or portion should be suitably away from either end of a waveguide length along which the back scattering occurs.

By way of example, the effect of shifting the optical phase of light propagating through cross-section 13 of the waveguide 10 by a phase shift $\Delta\phi_1$ on the optical field $E_r$ of the backscattered light 31 at the input end 11 of the waveguide 10 can be expressed as $$E_r(\Delta\phi) = C_1 + \exp(2i\Delta\phi_1)C_2 \quad (2)$$

where $$C_1 = \Sigma_1(A_n * R_n * B_n * \exp(2i\phi_n)) \quad (3)$$

and $$C_2 = \Sigma_2(A_n * R_n * B_n * \exp(2i\phi_n)) \quad (4)$$

Here $C_1$ and $C_2$ represent the contribution of the waveguide's light scattering defects located to the left from the phase shift location 13 and to the right from the phase shift location 13, respectively, and the summation in the RHS of equations (3) and (4) is performed over scattering centers along the respective first, or "left," section 41 of the waveguide 10 and the second, or "right," section 42 of the waveguide 10. If the phase shifting location 13 along the waveguide is suitably selected, the optical power $P_r$ of the reflected light, $P_r=|E_r|^2$, at the input end 11 of the waveguide 10 may be substantially reduced by adjusting the phase shift $\Delta\varphi_1$ so that the two terms on the RHS of equation (2) add in counter phase to interfere destructively at a desired wavelength.

FIGS. 14A to 14D show box plots illustrating simulation results for a distribution of attainable return loss (RL) improvement in dependence on a position of a tunable phase shifter along the 0.5 cm long model SOI waveguide of FIG. 1A with for four different values of the waveguide loss. The horizontal axis in each figure indicates the tuner location measured in a fraction of the total length of the waveguide. The distributions are over one thousand wavelengths in a wavelength range from 1540 nm to 1560 nm. Each data point in a distribution represents the maximum RL improvement that is attainable for a particular wavelength by optimizing the phase shift at the indicated location. Each of the vertical boxes spans from the top of the first data quartile (Q1) to the top of the third data quartile (Q3), with the horizontal line segments within each box indicating the median. The height of each box represents the inner quartile range (IQR) containing half of all data points. The top whisker is at $[Q2+1.5*(Q2-Q1)]$.

As can be seen from the box plots, according to the simulations the maximum RL improvement that is attainable by adding an optimum phase shift at some point along the waveguide may significantly depend on the operating conditions, such as the wavelength of the propagating light, or likely the device temperature, and at any location along most of the waveguide length may exceed 5-10 dB or even 15 dB at some wavelength. For the relatively lower-loss waveguides (FIGS. 14A, 14B) locating a tunable phase shifter anywhere along a middle portion of the waveguide, starting after the first ~15% of the waveguide length and spanning up to the last ~20% of the waveguide length, may result in an expected median RL improvement in the range from ~3 dB to ~8 dB, with a maximum improvement exceeding 20 dB, and can potentially be even as high as 30-40 dB, depending on the operating wavelength; phase tuner locations along the middle third of the waveguide length appear to provide at least 3 dB RL improvement for most of the wavelengths. For the high-loss waveguides (FIGS. 14C, 14D) optimum tuner locations are understandably closer to the input end of the waveguide as the back reflections from the waveguide locations farther away from the input end are strongly attenuated, so that locating a tunable phase shifter as close to the input end as at the 5% of the waveguide length may provide a medium RL improvement of about 3 dB, with the IQR up to 8-10 dB and a maximum improvement exceeding 15 dB.

One way to accomplish the desired control of optical back scattering is to monitor the back scattered light 31 at a desired location along the waveguide path, and adjust the tunable phase shift $\Delta\varphi_1$ to minimize, reduce, or at least stabilize the monitored optical power. The location of the monitoring point may be, for example, at or near an input port of the waveguide system, such as at or near the input end 11 of the waveguide 10.

Figure 2:
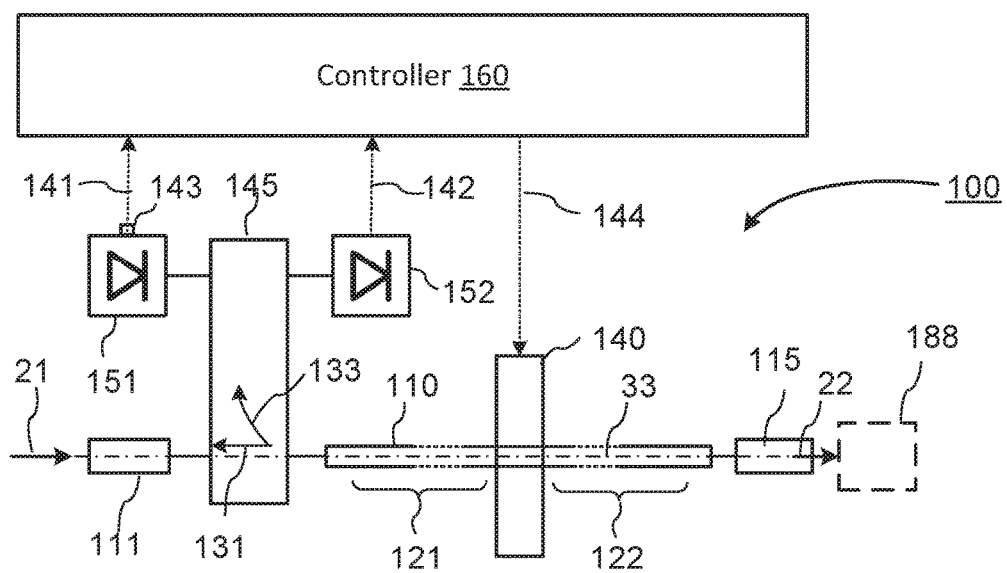
FIG. 2 is a schematic diagram of a system for an automated control of optical back scattering in a waveguide device.

With reference to FIG. 2, there is illustrated an example optical waveguide system (OWS) 100 that includes features enabling control of the optical back scattering therein. The OWS 100 includes an input optical waveguide port 111 configured to receive input light 21, an output optical waveguide port 115, and at least one optical waveguide 110 disposed to guide the input light 21 along an optical waveguide path 33 from the input port 111 to the output port 115.

In operation the input light 21, while propagating towards the output port 115, is partially converted into backscattered light 131 that propagates in the reverse direction towards the input waveguide port 111. What remains of the input light 21, exits the waveguide 110 from the output waveguide port 115 as output light 22. The input waveguide port 111 may be, for example, in the form of an input end of the waveguide 110, such as for example an end of a planar waveguide at an edge of an optical chip. It can also be in any other suitable form enabling light to be injected into the waveguide 110, for example the input port 111 may be in the form of an optical waveguide grating, or a directional optical coupler. Similarly, the output port 115 may also be in the form of a waveguide end, or an output optical coupler, or the like. The output waveguide port 115 may optionally terminate with an integrated optical device 188, such as for example a photo-detector, a mirror, or any other optical terminal device or element.

The OWS 100 may further include one or more photo-detectors (PD), such as a feedback photodetector (PD) 151, also referred to herein as the first PD 151, and an optional forward PD 152, also referred to herein as the second PD 152. An optical coupler 145 may be disposed at or near the input waveguide port 111 so as to tap off a portion 133 of the backscattered light 131 and to couple the tapped-off portion 133 of the backscattered light, also referred to as the tapped-off light 133, into the first PD 151. A fraction of the input light 21 may be optionally coupled by the same coupler 145 or a different optical coupler into the forward PD 152 when desired to monitor the input light 21. The first PD 151 has an electrical PD port 143 which in operation outputs an electrical PD signal 141, also referred to herein as the first electrical PD signal, which may be denoted as $S_1$ and which is responsive to variations in an optical power of the tapped-off light 133 received by the PD 151, and hence to variations in the backscattered light 131.

The OWS 100 further includes at least one optical phase tuner 140 that is configured to act upon the optical waveguide 110 so as to vary an optical phase of light propagating in the waveguide in response to one or more electrical control signals 141. The optical phase tuner 140 may be configured to vary an optical length of at least a middle portion of the optical waveguide 110. This may be accomplished, for example, by varying the refractive index of at least a portion of the optical waveguide 110 using one of known approaches, such as those based on thermal-optic, electro-optic, and magneto-optic effects wherein the refractive index of a length of the waveguide is varied by changing its temperature, by applying an electrical or magnetic field, or by changing a concentration of electrical charge carriers in a section of the waveguide.

The function of generating the phase control signal 144 and varying it in dependence at least in part upon the first PD signal 141 may be performed by a controller 160 that is electrically connected to the feedback PD 151 and the optical phase tuner 140, providing a phase-controlling feedback loop. In one embodiment, the controller 160 may be configured to vary the electrical control signal 144 so as to minimize, or at least decrease, the first electrical PD signal 141, which is indicative of the optical power $P_1$ of the back scattered light 131 at the optical coupler 145. In one embodiment, the controller 160 may be further connected to the second PD 152 and may receive a second PD signal $S_2$ 142 therefrom that is indicative of the optical power $P_2$ of the forward-propagating input light 21. In this embodiment the controller 160 may also be configured to vary the phase control signal or signals 144 so as to minimize or at least reduce a return optical loss RL of the OWS 100. The return optical loss RL can be measured or estimated from a ratio k of the first PD signal 141, which is indicative of the backscattered light 133, to the second PD signal 142:

$$k = \frac{S_1}{S_2} \sim \frac{P_1}{P_2} \quad (5)$$

Here $S_1$ and $S_2$ may represent, for example, photocurrents generated by the first and second PDs 151, 152 in response to light they receive, respectively. Thus, in one embodiment the controller 160 may be configured to measure the return optical loss RL of the OWS and to control, e.g. minimize it, by varying the electrical phase control signal 144. The return optical loss, expressed in decibels, may be estimated as $$RL = 10 \log_{10} k + C_{coupler}, \quad (6)$$

where $C_{coupler}$ is a constant that depends on the coupling coefficients of the optical coupler 145 and conversion efficiencies of the PDs 151, 152.

It will be appreciated that the controller 160 may be embodied using digital or analog circuitry which may implement a variety of control algorithms known in the art, including but not limited to any combination of proportional, integral, and derivative control, parameter adaptive control, or robust control optimization.

In some embodiments, the control algorithm implemented by the controller 160 may use known techniques for finding the smallest minimum among a plurality of minima in the dependence of $S_1$ or κ upon the phase control signal 144. In some embodiments, the control algorithm may use known data related to the spectral response of the system with regards to environmental and operating parameters to find optimal input/output relationships and path dependencies. For example, the controller 160 may store data mapping the return loss as a function of temperature, wavelength, and phase tuner response. Based on this functional mapping, the control algorithm may initialize the phase tuner at a phase shift that enables low return loss as the temperature changes or the wavelength drifts. Furthermore, the initialized phase shift may allow that the controller to optimally minimize the return loss across a wide temperature range in the presence of a limited phase shift control range. By way of example, if the total phase shift control range for the phase tuner exceeds 2π, so that there are multiple optimal values of the phase control signal 144 that minimize the return loss within the control range, the controller 160 may be configured to initialize the phase tuner at a point where it is more likely to stay within the phase shift control range when temperature changes, based on the stored mapping of the RL versus temperature.

In some embodiments, the controller 160 may be configured to dither the phase control signal 144 and thereby to dither the optical phase Δφ of the light in the waveguide 110, and to detect a signature of the dither signal in the electrical PD signal 141. The controller 160 may for example superimpose a dither signal, such as for example a low-frequency modulation tone, on a cw component of the control signal 144, detect the dither signal or tone in the first PD signal 141, and to vary the cw component of the control signal 144 so as to reduce the strength of the dither tone in the first PD signal 141. The frequency of the dither tone may be, for example, in a kilohertz range, or generally as desired in the system design. In some embodiments, the strength of the dither signal recorded in the first PD signal 141 may be normalized to the second PD signal 142 so as to make the control algorithm independent of possible changes in the optical power of the input light 21.

In one embodiment, the optical phase tuner 140 may be in the form of a tunable local phase shifter that is disposed at a selected location in a middle portion of the waveguide 110 and configured to selectively shift an optical phase of light propagating in the waveguide 110 at the selected waveguide location by a variable optical phase shift Δφ in response to the phase control signal 144. Referring to a section 121 of the waveguide 110 between the input port 111 and the phase shifter 140 as the first waveguide section 121 and a section of the waveguide 110 between the phase shifter 140 and the output port 115 as the second waveguide section 122, in one embodiment the location of the phase shifter 140 along the waveguide 110 may be selected so that, at the coupler 145, the strength of backscattering light originating in the first waveguide section 121 and the strength of backscattering light originating in the second waveguide section 122 are approximately equal, and therefore can approximately cancel each other by a suitable selection of the optical phase shift Δφ produced by the phase shifter 140. Here the strength of the backscattered light may refer to the optical power of the backscattered light at a particular operating wavelength or temperature. In some cases, for example in the presence of a small number of known reflection artifacts, it may be estimated from known parameters of the optical waveguide, such as the waveguide geometry and length, optical loss of the waveguide, and the back-scattering coefficient in the waveguide in an operating wavelength range.

In one embodiment, the location along the waveguide path 33 where the optical phase tuner 140 adds the variable optical phase shift Δφ to the light propagating in the waveguide may be selected so as to enable at least 3 dB, and preferably at least 10 dB variation of the optical power $P_1$ of the tapped-off portion of the back-scattered light 133 by varying the optical phase shift Δφ. In one embodiment, the location wherein the optical phase is adjusted by the phase tuner 140, may be selected so as to maximize the sensitivity of the return loss RL, for example as can be measured by the controller 160, to the optical phase variations Δφ.

In the example embodiment described herein the optical coupler 145 may be disposed close to the input port 111, so that optical backscattering that happens in a section of the waveguide 110 between the input port 111 and the coupler 145, which is not compensated by the phase control loop, is below an acceptable backscattering level for the system. In other embodiments the optical coupler 145 may be disposed away from the input port 111, and may also be disposed optically prior to the input port 111. Generally, when the optical coupler 145 is disposed in the waveguide path 33, it may be disposed at, or suitably close to, a location along the waveguide path where the backscattered light is to be controlled in accordance with design requirements of a particular system implementation.

The optical waveguide 110, although schematically illustrated in FIG. 2 by way of example as a section of a linear optical waveguide, in various embodiments may vary in configuration along the optical path 33 and may include one or more optical waveguide devices such as waveguide couplers, resonators, Mach-Zehnder interferometers (MZI), array waveguide gratings, optical polarizers, sensors, and the like, each of which may include defects and irregularities causing back reflections.

Figure 3:
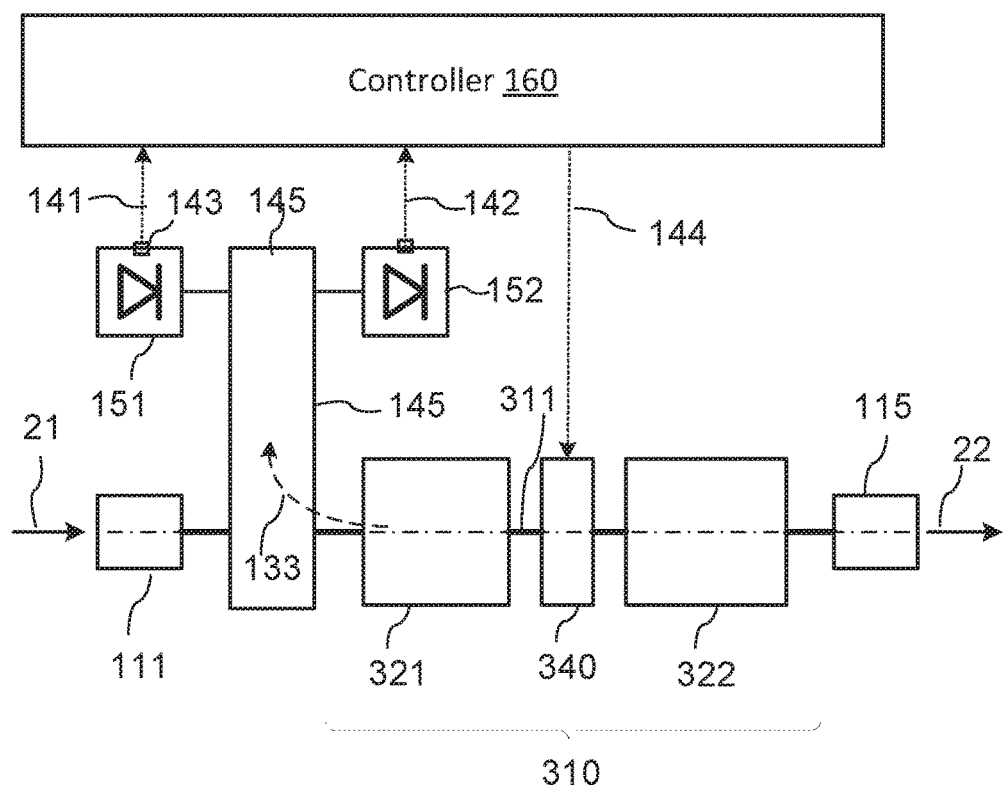
FIG. 3 is a schematic block diagram of an embodiment of the system of FIG. 2 with a local optical phase shifter disposed between two waveguide sections.

Referring to FIG. 3, there is illustrated an embodiment of OWS 100 wherein an optical phase tuner in the form of a local tunable phase shifter 340 is disposed optically inbetween a first waveguide device 321 and a second waveguide device 322, with the first waveguide device 321 embodying the first waveguide section 121 of the OWS 100 of FIG. 2, and the second waveguide device 322 embodying the second waveguide section 122 of the OWS 100 of FIG. 2, with a waveguide section 311 therebetween. Each of the first and second waveguide devices 321, 322 may, for example, be in the form of, or include, an optical waveguide interconnect and/or a functional waveguide device such as an optical coupler, an MZI, a polarizer, an optical modulator, an optical resonator, etc. The local phase shifter 340 in this example embodiment is configured to controllably adjust an optical phase of light as it propagates between the first waveguide device 321 and the second waveguide device 322 in either direction.

Figure 13A:
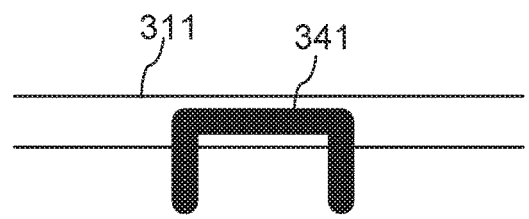
FIG. 13A is a schematic diagram illustrating an optical phase shifter embodied as a resistive electrical heater disposed over a section of a waveguide.
Figure 13B:
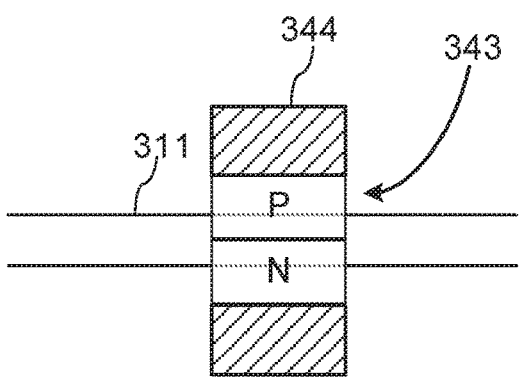
FIG. 13B is a schematic diagram illustrating an optical phase shifter embodied as a p/n junction formed across a section of a waveguide.

In one embodiment, the local phase shifter 340 may be for example in the form of an electrical heating element 341 disposed at the selected location at or over the waveguide section 311, as illustrated in FIG. 13A. In another embodiment, wherein a waveguide section 311 connecting the first and second waveguide devices 321, 322 is formed at least in part of a semiconductor material, such as for example silicon (Si) or a compound semiconductor such as GaAs or InP, or various alloys thereof, the phase shifter 340 may include a p/n junction 343 as illustrated in FIG. 13B, configured to change the concentration of charge carriers in at least a portion of the waveguide section 311, thereby changing its refractive index. The local concentration of the charge carriers in the waveguide 311 may be varied by varying a voltage or current applied to the electrical contacts 344 of the p/n junction as the phase control signal 144. In one embodiment wherein the waveguide section 311 connecting the first and second waveguide devices 321, 322 is formed at least in part of an electro-optic material which refractive index depends on electric field, the phase shifter 340 may be in the form of one or more electrodes 345, illustrated in FIG. 13C, configured to create an electric field across at least a portion of the waveguide 311 in response to an applied voltage as the phase control signal 144.

Although FIG. 3 shows only one local phase shifter 340, it will be appreciated that other embodiments may use two or more local phase shifters disposed at various locations along the optical waveguide path of the input light in the optical waveguide system. In some embodiments these locations may be selected so as to ensure, or make likely, that the intensity of the back scattered light 133 coupled into the first PD 151 is sensitive to the optical phase shift or shifts that may be induced by the respective local phase shifters disposed at these locations.

Figure 4:
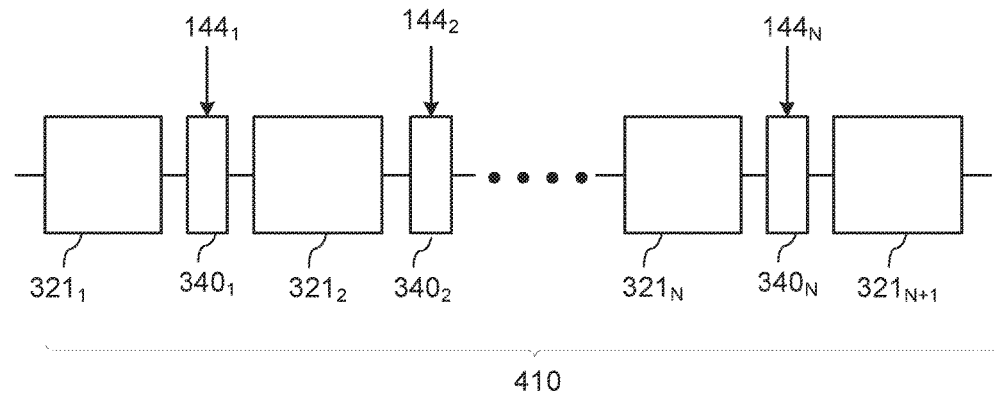
FIG. 4 is a schematic block diagram illustrating multiple local optical phase shifters interspersed between multiple waveguide sections for controlling optical back scattering in the waveguide device.

Turning now to FIG. 4 while continuing to refer to FIGS. 2 and 3, there is schematically illustrated an optical waveguide path 410 formed by (N+1) waveguide sections or devices $321_1$, $321_2$, ..., $321_{N+1}$ that are optically connected in series. The optical waveguide path 410, which may be viewed as an embodiment of the waveguide 110 of FIG. 2, further includes a chain of N local phase shifters $340_1$, $340_2$, ..., $340_N$, where N≥2, disposed along the length of the waveguide path, with each phase shifter 340n disposed between two consecutive waveguide sections or devices $321_n$ and $321_{n+1}$. Each of the phase shifters 340n may be controlled by a respective phase control signal $144_n$ from the controller 160 (not shown in FIG. 4) so as to induce an optical phase shift $\Delta\varphi_n$, n=1, ..., N, at the corresponding location along the waveguide path to light propagating in the waveguide. The waveguide path 410 may be connected between the input optical coupler 145 and the output port 115 of the OWS of FIGS. 2 and 3 replacing respective waveguides and waveguide devices 110, 310, as illustrated in FIG. 5.

The controller 160 may be configured to dynamically adjust each of these phase control signals $144_n$ so as to control back reflections during the device operation. For example, in one embodiment the controller 160 may be configured to dynamically adjust each, or at least some, of the phase control signals $144_n$ so as to minimize or at least reduce the back reflections as measured by the first PD 151, possibly normalized to the input optical power $P_2$ as measured by the second PD 152, as described hereinabove. Although FIG. 4 shows 3 phase shifters 340n, this is by way of illustration only, and the number N of the phase shifters 340n may vary from as few as one or two to as many as 5-7 or more, depending on the system design and requirements, e.g., the length of the waveguide path 410 and the degree of the desired suppression of the back reflections.

In some embodiments the local phase shifters 340n may be provided at various locations along the waveguide path 410, but in operation only a fraction of them, or just one, is dynamically tuned to control the intensity of the back scattered light 133 or the return loss. In one embodiment, the method of the present disclosure for controlling the back scattering may include selecting, at a device calibration stage, which of the N provided phase tuners 340n exerts the greatest effect on the back-scattered light 133, and hence should be dynamically controlled in operation by the controller 160. The calibration procedure may include, for example, i) providing the light of a desired operating wavelength at the input port 111, ii) tuning each of the phase shifters 340n, one by one, across their respective phase tuning range while monitoring the PD signal 141, and iii) selecting one of the N phase shifters 340n which tuning provided the greatest effect on the PD signal 141, e.g., the greatest suppression of said signal. In one embodiment, in operation one or more of the remaining phase shifters 340n may be left uncontrolled or set to provide a constant phase shift, which value may also be optimized during the calibration. In one embodiment, two or more of the phase shifters 340n may be selected at the calibration stage based on their effect on the back-scattered signal or the return loss, and then dynamically tuned in operation by the controller 160 to control the back scattering. In some embodiments, the selection of the phase shifter or shifters to dynamically adjust in operation may change in dependence on the operating wavelength, and/or temperature. In some embodiments, the controller may select a first subset of the tunable local phase shifters 340n for tuning in dependence upon the first electrical PD signal 141 when the input light comprises a first operating wavelength, and may select a second, different, subset of the tunable local phase shifters 340n for tuning in dependence upon the first electrical PD signal 141 when the input light comprises a second operating wavelength that is different from the first wavelength. Each of the first and second subsets may consists of one or more phase shifters 340n. In some embodiments, the controller 160 may store information indicating which of the phase shifters 340n to use for various operating wavelengths and/or temperatures. In some embodiments, the selection which of the phase shifters to use for the dynamic control of back reflections may depend on other components that may be optically coupled down the path of the waveguide.

Figure 5:
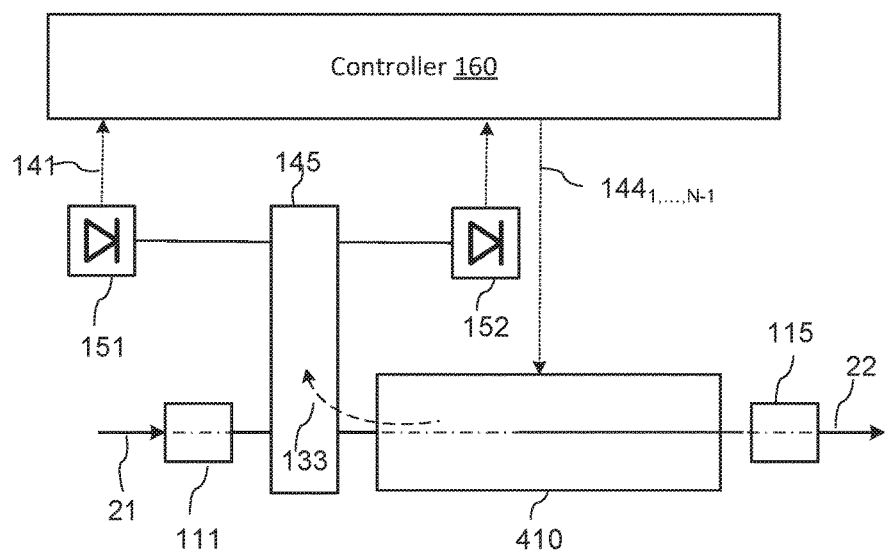
FIG. 5 is a schematic block diagram of an embodiment of the system of FIG. 2 with an optical filter in the feedback loop to selectively control back scattering at a sub-set of input wavelengths.
Figure 13C:
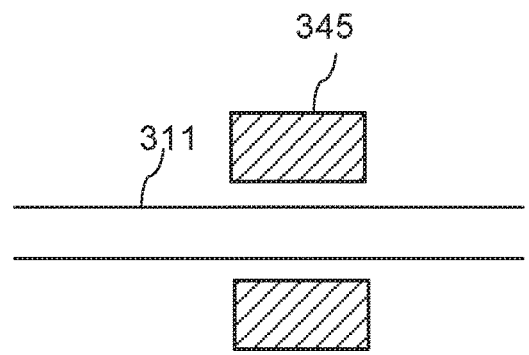
FIG. 13C is a schematic diagram illustrating an optical phase shifter embodied with electrical contacts disposed for applying a voltage across a section of a waveguide.
Figure 13D:
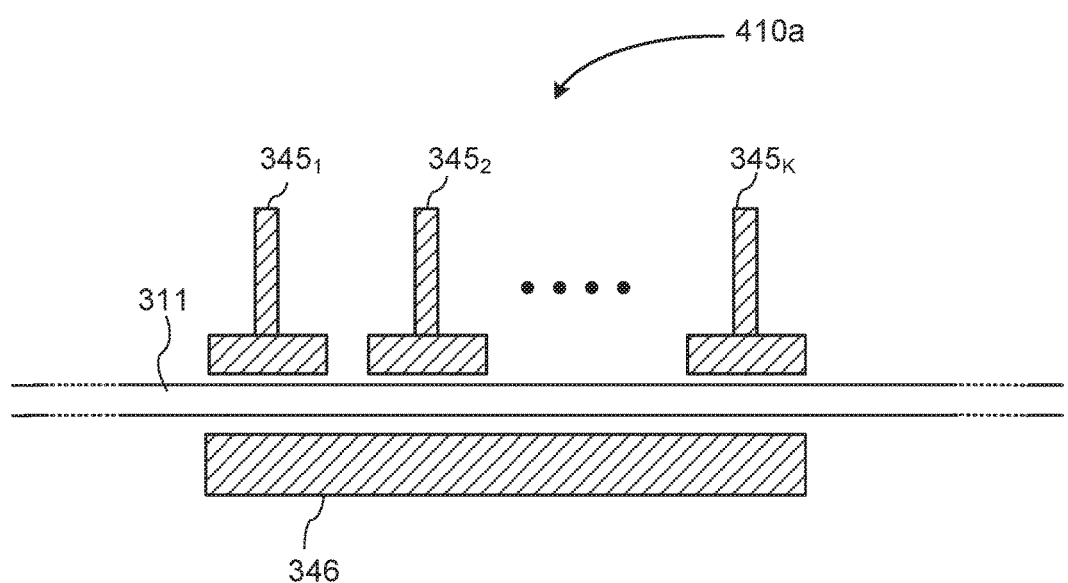
FIG. 13D is a schematic diagram illustrating an optical waveguide path with a sequence of electrodes disposed along its length so as to enable adding tunable phase shifts at various locations along the waveguide path.
Figure 14A:
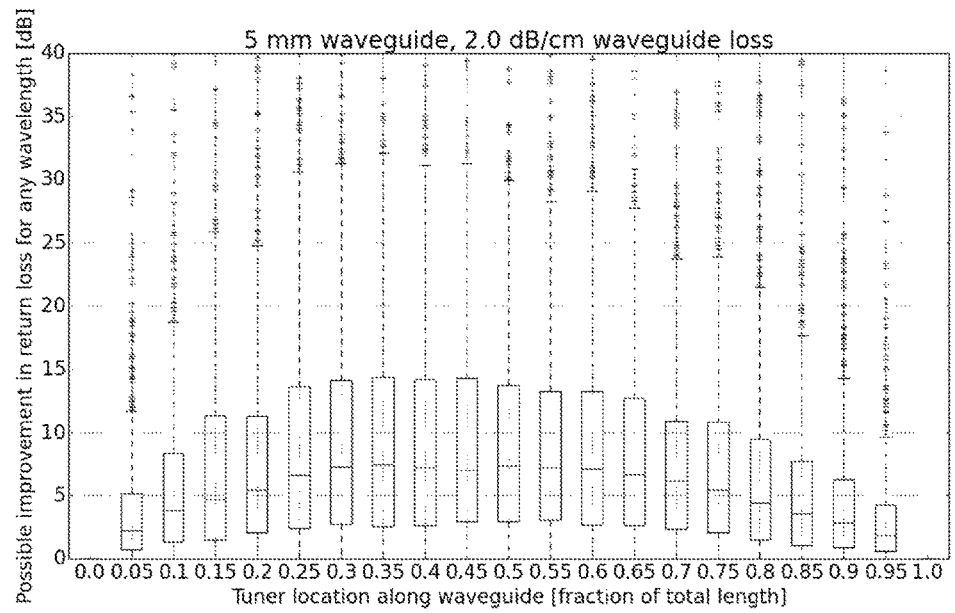
FIG. 14A is a graph illustrating a simulated distribution of attainable RL improvement across a plurality of operating wavelengths for various locations of the optical phase shifter along a 2 cm long waveguide with optical loss of 2 dB/cm.
Figure 14B:
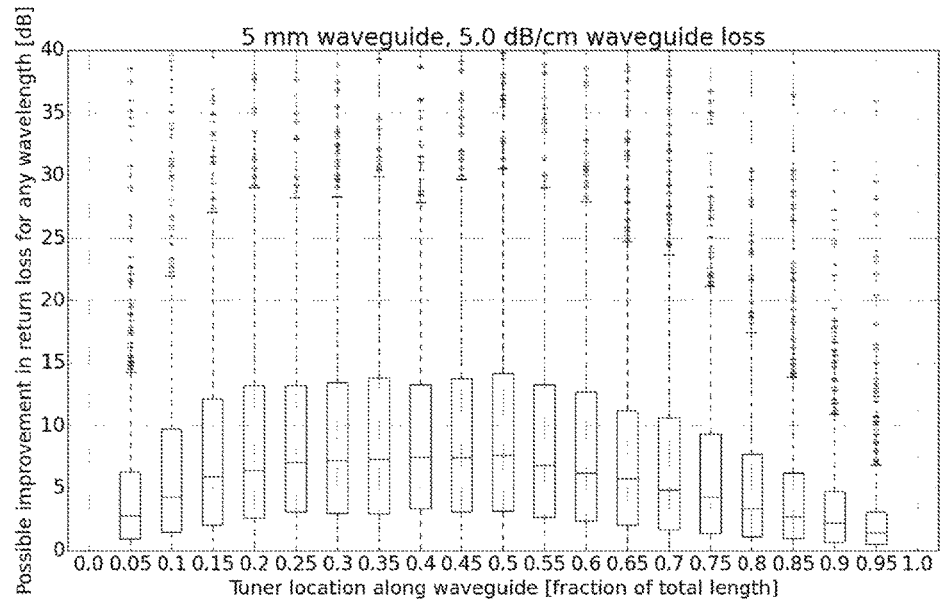
FIG. 14B is a box plot illustrating a simulated distribution of attainable RL improvement across a plurality of operating wavelengths for various locations of the optical phase shifter along a 2 cm long waveguide with optical loss of 5 dB/cm.
Figure 14C:
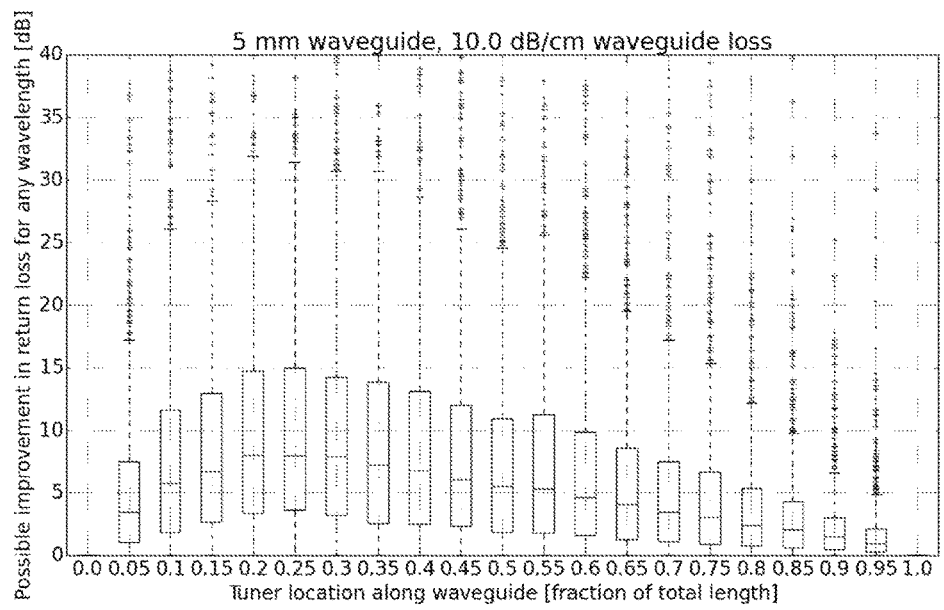
FIG. 14C is a graph illustrating a simulated distribution of attainable RL improvement across a plurality of operating wavelengths for various locations of the optical phase shifter along a 2 cm long waveguide with optical loss of 10 dB/cm.
Figure 14D:
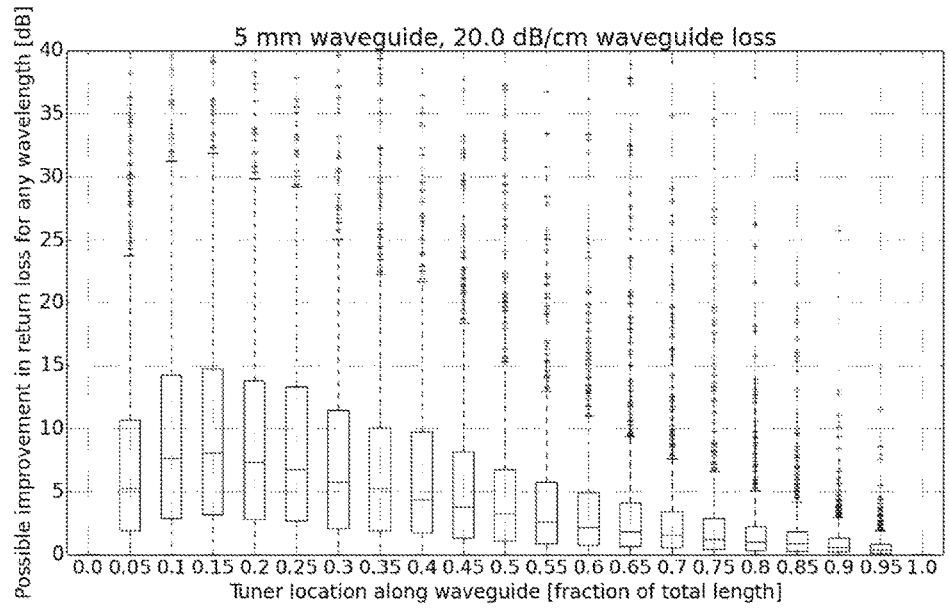
FIG. 14D is a graph illustrating a simulated distribution of attainable RL improvement across a plurality of operating wavelengths for various locations of the optical phase shifter along a 2 cm long waveguide with optical loss of 20 dB/cm.

Referring to FIG. 13D while continuing to refer to FIG. 5, there is illustrated an embodiment 410a of the waveguide path 410 which includes a plurality of K>1 local phase tuners formed by a sequence of K individually addressable electrodes $345_1$, $345_2$, ..., $345_K$ disposed at various locations along a waveguide 311. A ground electrode 346 may be provided on the opposite side of the waveguide. The waveguide 311 may be formed with an electro-optic material which refractive index varies in dependence on electrical field. In some embodiments wherein the waveguide 311 is formed in a semiconductor material, for example silicon, the electrodes $345k$, k=1, ..., K, may provide electrical contacts to one or more p/n junctions formed in the waveguide 311 as described hereinabove with reference to FIG. 13B. In some embodiments, the electrodes $345k$, k=1, ..., K, may be replaced by a series of resistive heaters, as illustrated in FIG. 13A. One or more of these electrodes $345k$ that provides the greatest effect on the back scatter PD signal 141 may be selected at calibration, and then used by the controller 160 in operation to dynamically adjust the optical phase of the propagating light with a variable feedback-controlled electrical signal 144, or two or more such signals if more than one of the electrodes $345k$ are selected, to control the back-scattering, as described hereinabove. In one embodiment, the same variable feedback-controlled electrical signal 144 may be provided to a selected subset of the electrodes $345k$ implementing tunable phase shifters. By way of example, in an embodiment with K=4 electrodes, the controller 160 may provide the same control signal 144 to the $1^{st}$ and $3^{rd}$ electrodes, as selected based on calibration data for the specific operating conditions.

Figure 6:
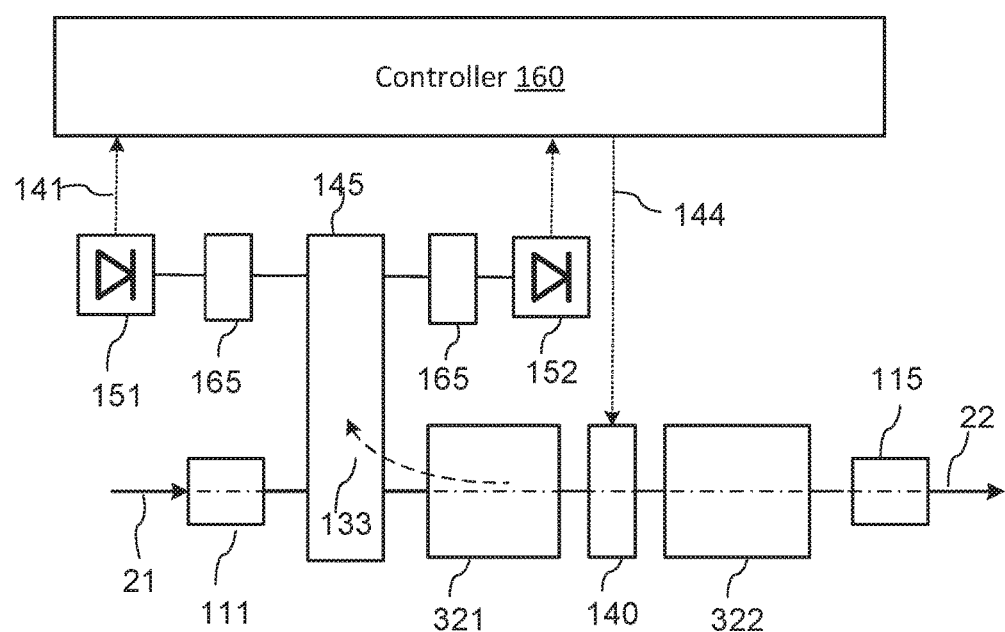
FIG. 6 is a schematic block diagram of an embodiment of the system of FIG. 5 with a light terminating device.

Referring now to FIG. 6, there is illustrated an embodiment of the OWS 100 that is generally similar to that shown in FIG. 3 but additionally includes one or more optical filters 165 in the path of light tapped-off by the optical coupler 145. These optical filters 165 may be useful in embodiments wherein the input light 21 includes multiple wavelengths, such as for example when used in a WDM optical communication system, and it is desired to control the backscattering only for a sub-set of these wavelengths in a selected wavelength range. In such embodiments, the optical filter or filters 165 may be configured to pass the selected wavelength or wavelengths of interest and to block all other wavelengths that may be present in the input light 21 outside of the selected wavelength range.

In each of the example embodiments described herein the optical coupler 145 may be implemented in a variety of ways, such as for example, but not exclusively, as a directional optical coupler, a 2×2 multimode interference (MMI) coupler, or a micro-ring waveguide resonator. Each of these coupler implementations may be configured to provide a degree of wavelength selectivity, and therefore may combine optical coupling and optical filtering functionalities. In embodiment wherein the optical coupler 145 is disposed in the path of a multimode waveguide, it may be configured to couple out a substantially same fraction of each of the guided modes supported by the waveguide, or it may be configured to preferentially tap off light in one or more selected modes, so as to selectively control the backscattered power into said mode or modes.

Figure 7:
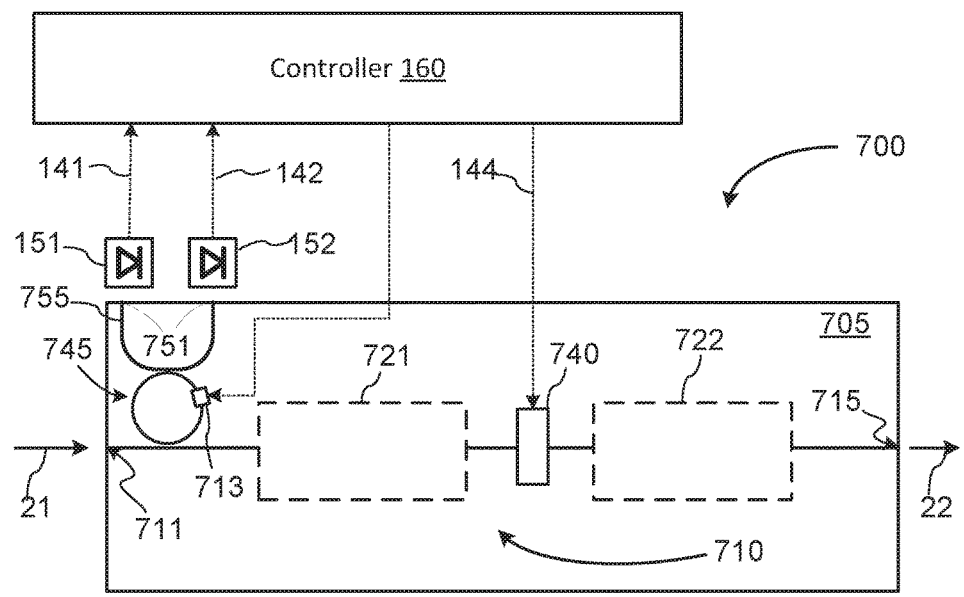
FIG. 7 is a schematic diagram of one embodiment of the system of FIG. 2 using a micro-ring resonator as an input optical coupler for tapping off backscattered light.

Referring to FIG. 7, there is illustrated an example OWS 700 implemented as a planar light wave circuit (PLC) in a PLC chip 705. The PLC 700 may be viewed as an embodiment of the OWS 100 of FIG. 2, with a planar optical waveguide 710 embodying the optical waveguide 110 of the OWS 100 of FIG. 2. In the illustrated example embodiment, the planar optical waveguide 710 terminates at opposing edges of the chip 705, with a first waveguide end 711 of the waveguide 710 proving the input optical port, and the second waveguide end 712 providing the output optical port. It will be appreciated that in other embodiments the optical ports may be provided by waveguide ends terminating at the same edge of the chip, or with one or both of the optical ports configured for optical coupling from the top surface of the chip. In some embodiments, the output waveguide port 715 may terminate with an optical device integrated in the PLC chip 705. The planar optical waveguide 710 further includes a first waveguide section 721 and a second waveguide section 722 connected in series, with a local optical phase shifter 740 disposed between them.

The local phase shifter 740 may be embodied, for example, using an electrical heating element, an electrode pair, or a p/n junction, as described hereinabove with reference to the phase shifter 340 of FIG. 3 and further with reference to FIGS. 13A-13C. Each of the first and second waveguide sections 721 and 722 may be in the form of, or include, an optical waveguide interconnect and/or a functional optical waveguide structure or device such as, for example, an optical coupler, an optical modulator, an MZI, a resonator, a polarizer, a sensor, or the like.

The PLC 700 further includes a micro-ring resonator 745 that is optically coupled to the planar optical waveguide 710 near the input end 711 thereof. The micro-ring resonator 745 embodies the input optical coupler 145 of the OWS 100. The micro-ring resonator 745 is optically coupled to a tap-off waveguide 755 which guides tapped-off forward and back propagating light to optical monitoring ports 751 of the chip. The tapped off back-propagating and forward-propagating light is then coupled to the monitoring PDs 151 and 152, respectively, which functions are generally as described hereinabove with reference to FIGS. 2 and 3.

The PLC chip 705 may be, for example, a SOI chip, a compound semiconductor chip, or it can be made with a dielectric electro-optic material such for example lithium niobate (LiNbO3) or lithium tantalate (LiTaO3). By way of example, PLC chip 705 may be a SOI chip with the PLC 710 formed by high-contrast planar waveguides with waveguide cores defined in the silicon layer thereof.

The micro-ring structure 745 functions generally as a four-port directional coupler in that it taps off a portion of the backscattering light propagating towards the input port 711 and a portion of forward propagating input light 21 and directs them towards monitoring PDs 151 and 152, respectively, except it provides an additional wavelength selectivity related to micro-ring resonances which are known in the art; this additional wavelength selectivity can be utilized to direct predominantly a specific wavelength or wavelengths towards the monitoring PDs, which provides wavelength selectivity to the feedback loop facilitated by the controller 160 and enables adjusting the optical phase shift Δφ induced by the phase shifter 740 so as to suppress the optical back-scattering specifically at the selected wavelengths. In one embodiment, the micro-ring 745 may include a wavelength tuning element 713, generally in the form of an optical phase shifter that may be generally similar in design to the optical phase shifter 740, to tune a resonance of the micro-ring to a desired wavelength at which the backscattering in the PLC 710 is to be suppressed.

The micro-ring 745, or any other suitable optical tap-off coupler or couplers that may be used in its place, should be disposed close to the input port 711, so that optical back-scattering that happens in a section of the waveguide between the input port 711 and the micro-ring 746, which is not compensated by the control loop, is below an acceptable backscattering level for the system.

The monitoring PDs 151 and 152 may be external to the PLC chip 705, or may be integrated within the PLC chip 705, for example in the form of p/n or p/i/n junction diodes.

In some embodiments, wherein the PLC chip 705 is fabricated using a CMOS compatible technology, the electrical circuitry of the controller 160 may also be integrated in part or fully with the PLC chip 705.

Although FIG. 7 shows the PLC 700 implemented in a single chip, it will be appreciated that in other embodiments the same or similar PLC may be implemented in two or more PLC chips optically coupled together in series to form a single waveguiding path, and the local phase shifter 740 may be used to control optical scattering that happens along a length of that waveguiding path that spans the two or more PLC chips. For example, the waveguiding sections 721 and 722 of the PLC 710 of FIG. 7 may be disposed in two different PLC chips, with the optical phase shifter 740 formed in either one of these chips or being in the form of an additional element or PLC chip disposed optically between the chips embodying the first and second waveguiding sections.

Embodiments described hereinabove with reference to FIGS. 3-7 control optical back scattering using one or more local phase shifters that are configured to add a tunable optical phase shift at a specific location in the waveguide, or at a series of such locations. Other embodiments may include optical phase tuners that effect optical phase changes along a substantial portion of the waveguide's length, or substantially everywhere in the waveguide, thereby changing how light reflected back from various imperfections within the waveguide interfere with each other. One way to tune the relative phases of the back scatter interference, and thus to effectively shift the backscattering spectrum in wavelength, is to change the temperature of the waveguide as a whole, or at least of a substantial portion of it. This may be accomplished, for example, using a temperature control element disposed to be in thermal contact with at least a middle length portion of the at least one optical waveguide of the OWS and configured to vary a temperature in the waveguide in response to the electrical control signal. Such a temperature control element may be for example in the form of an electric heater or a thermo-electric cooler (TEC). The electrical heater may be configured to heat the entire chip embodying the OWS or a portion thereof, or in the form of a resistive heater disposed to heat a portion of a length of the at least one optical waveguide at one or more locations along the length of the waveguide, as illustrated in FIG. 13A.

Figure 10:
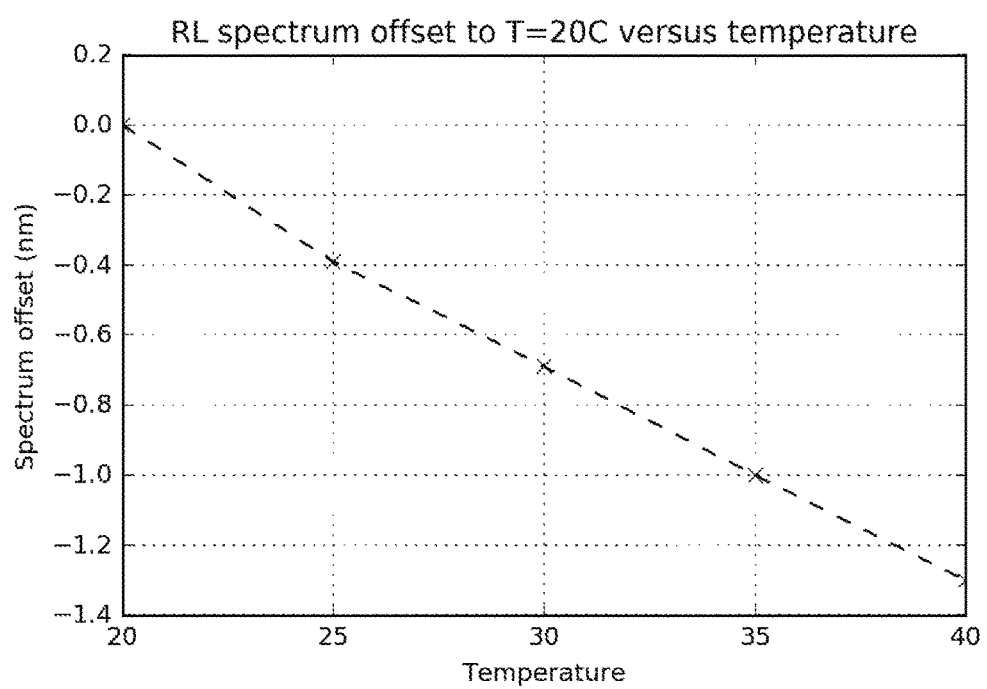
FIG. 10 is plot of an example dependence of a thermal shift of the backscattering spectrum on device temperature.

By way of example, FIG. 10 illustrates the shift of the optical spectrum of a waveguide return loss (RL) versus waveguide temperature for an example silicon waveguide structure formed in a SOI wafer, as measured for temperatures ranging from 20 C to 40 C (degree Celsius). In this example, the temperature shift of the return loss spectrum is approximately 70 pm per degree Celsius. Using the temperature induced shift of the RL spectrum such as that illustrated in FIG. 10, a feedback system may be established whereby the temperature of the chip is controlled in order to adjust the return loss spectrum to a favorable position.

Figure 8:
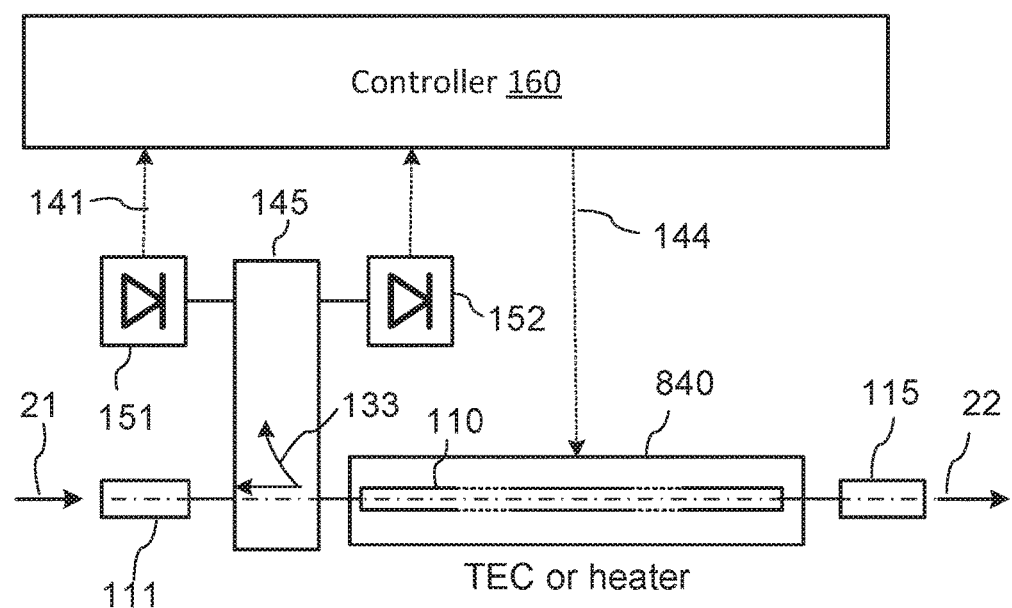
FIG. 8 is a schematic diagram of one embodiment of the system of FIG. 2 using a TEC or an electric heater in the backscatter control feedback loop to adjust the temperature of the waveguide.

Turning now to FIG. 8, there is schematically illustrated an embodiment of the OWS 100 of FIG. 1 wherein the optical phase tuner 140 is in the form of a temperature control element 840 that is configured to control the waveguide temperature along at least a substantial portion of the full length of the waveguide 110. In one embodiment, the temperature control element 840 may be in the form of an electrical heating element that is in a thermal contact with the waveguide 110 along the whole length of the waveguide. In one embodiment, the temperature control element 840 may be in the form of a thermo-electric controller (TEC) upon which a chip comprising the waveguide 110 is disposed. The controller 160 may be configured to adjust the temperature in the waveguide 110 in dependence upon the first PD signal 141, optionally normalized to the second PD signal 142, so as to minimize, or at least reduce that signal, thereby minimizing or reducing the return loss of the OWS.

Figure 9:
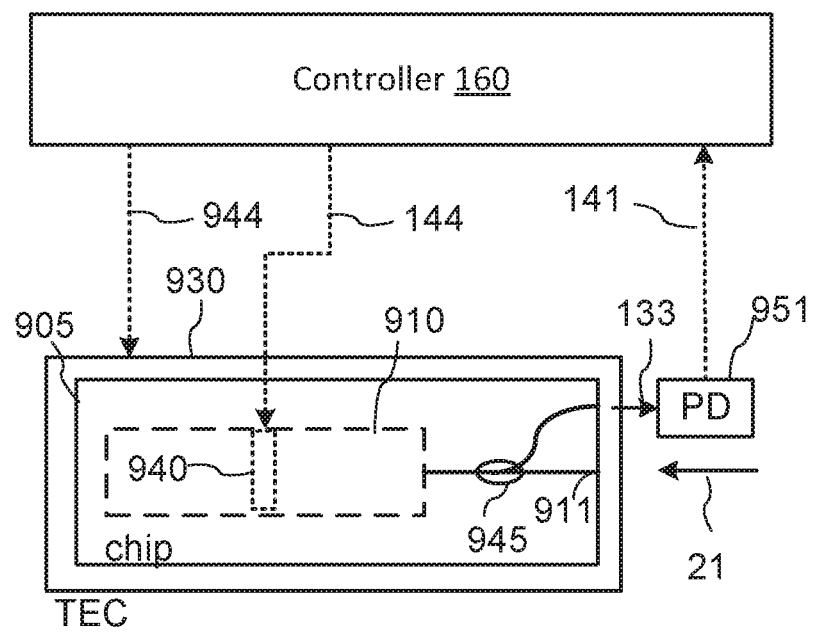
FIG. 9 is a schematic diagram of an embodiment of the system of FIG. 8 using a TEC or an electric heater in the backscatter control feedback loop to adjust the temperature of the chip.

With reference to FIG. 9, there is schematically illustrated an embodiment wherein a PLC chip 905, with a PLC including a waveguide device 910 formed therein, is mounted on a TEC 930. An input optical coupler 945 disposed near an input waveguide port 911 taps off a portion of backscattering light that is reflected back from the waveguide device 910 towards the input port 911, and directs the tapped-off light towards a reflection monitoring PD 951. The electrical PD signal 141 from the PD 951 is sent to the controller 160, which generates a TEC control signal 944 that regulates a temperature setting for the TEC 930. The controller 160 may be configured to adjust the TEC control signal 944 in dependence on the received PD signal 141 so as to minimize or at least substantially reduce it, thereby minimizing or reducing the backscattering signal at the input port 911. In one embodiment a second monitoring PD (not shown) may be provided to monitor variations in the input light 21, and the controller 160 may be configured to adjust the phase shifter 740 so as to control, e.g., minimize, the ratio of the two PD signals, and thereby to control the ratio of the backscattered optical power to the input optical power, as described hereinabove. In one embodiment the waveguide device 910 may include a local tunable phase shifter 940 disposed at a selected location along a constituent waveguide of the waveguide device 910, generally as described hereinabove, and the controller 160 may be configured to use a phase control signal 144 to tune the phase shifter 940 in dependence on the PD signal 141 to control the back reflections and/or the return loss from the waveguide device. In one embodiment, the controller 160 may adjust the TEC temperature, for example in dependence on the input wavelength, to increase the efficiency of the local phase shifter 940 in controlling, for example minimizing, the back reflections and/or the TL. In some embodiments the TEC 930 may be replaced by an electrical heating element configured to heat at least a significant portion of the waveguide device, such as the described hereinabove with respect to FIG. 8, which can be operated to optimize the efficiency of the local phase shifter 940 for specific operating conditions, such as the environmental temperature and/or the operating wavelength.

Various example embodiments described hereinabove with reverence to FIGS. 1-9 may be configured to implement a method or methods for controlling optical power of back scattered light in a respective OWS including at least one optical waveguide, which generally includes varying an optical phase of light propagating in the waveguide to control the back scattered power at or near an input optical port of the OWS, or at any other desired location along the waveguide path.

Figure 11:
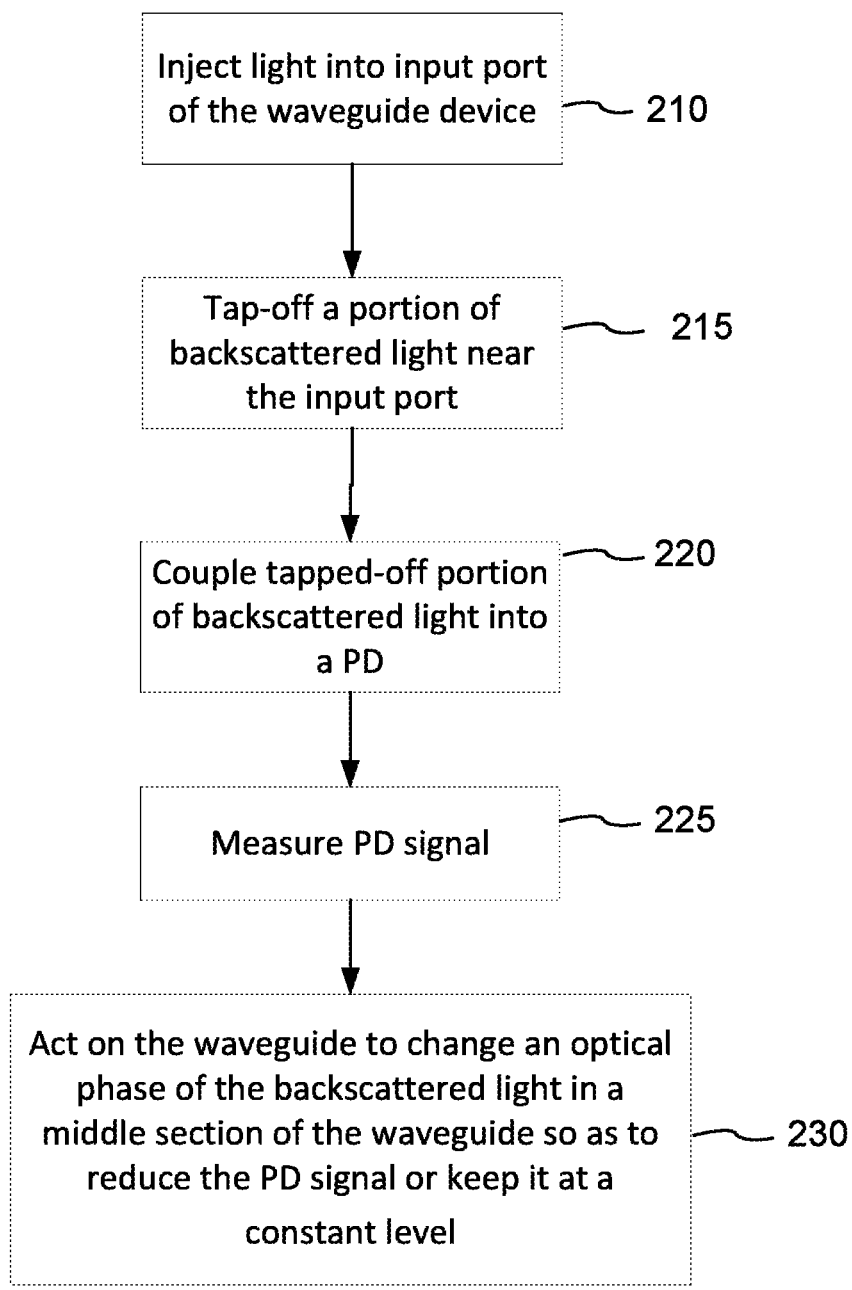
FIG. 11 is a flowchart of a method for an automatic suppression or control of waveguide back scattering by a feedback adjusting an optical phase in the waveguide path.

With reference to FIG. 11, this method in one embodiment thereof, generally referred to as method 200, may be described as follows. The method may start once input light is injected into an input end or port of the at least one optical waveguide, as indicated at 210. While propagating along the waveguide towards an output end thereof, the input light is being partially converted into backscattered light, with the back scattered light propagating towards the input end or port of the waveguide. At 215, a portion of the back scattered light propagating towards the input port is tapped off, for example at or near the input port, to form a tapped-off light, which is coupled into a first monitoring photodetector (PD) as indicated at 220. In some embodiments, a portion of the input light may be directed to a second monitoring PD for controlling variations in the input light.

At 225, an electrical PD signal or signals from the first and, optionally, second PD are measured. The electrical PD signal from the first PD is responsive to an amount of the tapped-off light received by the first PD. The at least one waveguide is acted upon at step 230 so as to control the electrical PD signal from the first PD, or a signal derived therefrom, for example to minimize or reduce it. This acting may generally include varying an optical phase of the backscattered light at one or more waveguide locations along a length of the at least one optical waveguide. In one embodiment, the optical phase of light propagating in the at least one optical waveguide may be adjusted so as to control the electrical PD signal from the first PD normalized to the electrical PD signal from the second PD, so as to eliminate the effects of variations in the input optical power.

Embodiments described hereinabove utilize a feedback circuit composed of a tap-off coupler, a photodetector, a controller, and an optical phase tuner to minimize or at least reduce the optical power of the backscattered light at a desired point in a system, such as at or near an input optical port of an OWS. However in some embodiments it may be sufficient to stabilize an average value of the backscattered power at a nearly constant acceptable level so as to avoid sudden jumps in the backscattered power, which may happen for example due to environmental or system fluctuations in view of the presence of strong undulations of the backscattered spectrum, as can be seen from FIG. 1A. Such stabilization of the backscattered light may be achieved, for example, by dithering the optical phase of light propagating in the waveguide in a suitably broad range so that the peaks in the wavelength dependence of the scattered optical power become substantially averaged out or smeared. Such embodiments may operate without any feedback from the measured backscattered power to the optical phase tuner, so that input optical coupler tapping-off the backscattered light, such as coupler 145 of the OWS 100 of FIG. 2, and the first PD 151 monitoring said light, may be omitted. The function of the controller 160 may be simply to dither the phase control signal 144 with a desired frequency and amplitude.

Figure 12:
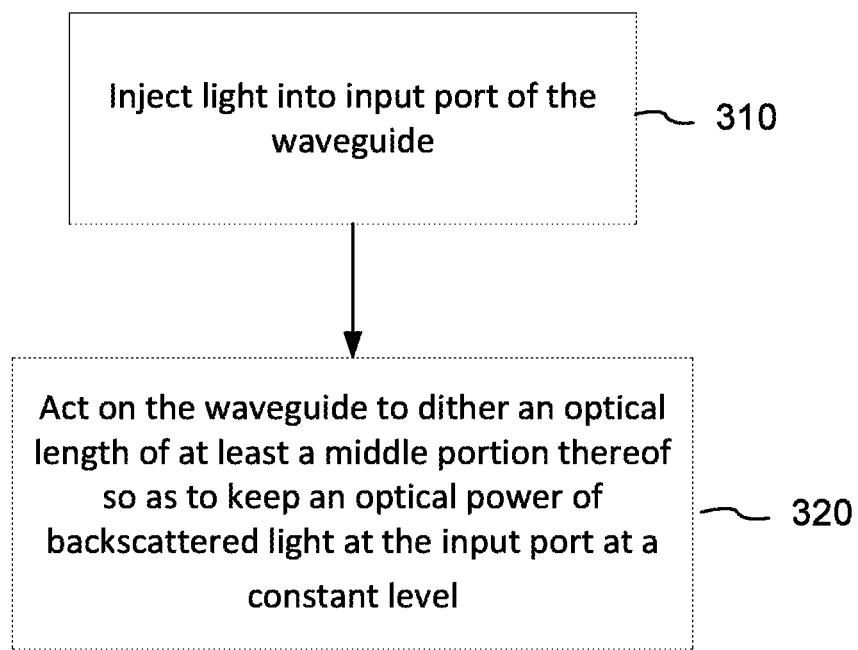
FIG. 12 is a flowchart of a method for an automatic stabilization of an average return optical loss by dithering an optical phase in the waveguide.

Referring to FIG. 12, accordingly in one embodiment the method for controlling the optical power of the backscattered light in an OWS including at least one optical waveguide may include substantially the following two main steps: a) injecting light into input optical port of the OWS at step 310, and b) acting upon the at least one optical waveguide to dither an optical phase of light propagating in the waveguide at one or more locations in the waveguide. This may include dithering an optical length of at least a middle portion of the waveguide so as to keep an average value of the optical power of the backscattered light at the input port at a constant level. Here, 'average value' means time averaging over several periods of the phase dither signal. The amplitude of the phase dither signal may be selected to achieve an averaging of the return loss spectrum, such as that shown in FIG. 1, over several peaks and valley thereof at a specific operating wavelength or wavelengths present in the input light.

This method may be implemented in any of the example embodiments described hereinabove with reference to FIGS. 2-9, by suitably configuring the controller 160 to dither the phase control signal or signals 144 or 944 with a desired frequency and amplitude. It will be appreciated that local optical phase shifter such as those exploiting the dependence of the reflective index of the waveguide on the electrical field, magnetic field, of charge carrier concentration may enable higher-frequency optical phase dithering and thus be preferable in some embodiments to those based on dithering device temperature.

It will be appreciated that any of the embodiments described hereinabove may incorporate features of the other embodiments. For example, control algorithms described hereinabove with reference to a specific embodiment may also be used in other described embodiment or their variations. That may include utilizing both a TEC and one or more local optical phase shifter to adjust propagation conditions in the optical waveguide or waveguides of the OWS so as to reduce the optical power of the back scattered light at the input port. In another example, instead of minimizing, reducing, or stabilizing the backscattered optical power as described hereinabove with reference to specific example embodiments, the method and system herein described may be used to control the backscattered light in other ways, as may be desired in some specific systems, for example to maximize or increase the backscattered power, for example for sensing applications. Those skilled in the art would be able to configure the controller 160 with a control algorithm suitable to accomplish the desired mode of optical back scatter control. The controller 160 may be implemented on the same chip with the OWS monolithically, on a different chip or chips in the same package, or as a separate analog or digital circuitry outside the package. Furthermore, the controller 160 may implement a control algorithm based on a variety of metrics, besides those described hereinabove, depending on a requirement of a particular system. For example, the controller 160 may be configured to maintain the return loss below a pre-defined level. Furthermore, although various embodiments described hereinabove utilize a second PD optically coupled to the OWS to detect variations in the input light and to estimate the return loss of the OWS, in other embodiments the controller 160 may receive information about the input optical power level elsewhere, for example from an optical system preceding the OWS, which may then be used to estimate the return loss, so that the second PD, such as the PD 152 of OWS 100 of FIG. 2, may be omitted.

The above-described exemplary embodiments are intended to be illustrative in all respects, rather than restrictive, of the present invention. Indeed, various other embodiments and modifications to the present disclosure, in addition to those described herein, will be apparent to those of ordinary skill in the art from the foregoing description and accompanying drawings. Thus, such other embodiments and modifications are intended to fall within the scope of the present disclosure. For example, it will be appreciated that the optical waveguide systems described herein may be implemented using dielectric material, such as glass or lithium niobate, and different semiconductor materials, including but not limited to silicon, as well as various compound semiconductor materials of groups commonly referred to as A3B5 and A2B4, such as GaAs, InP, and their alloys and compounds. Furthermore the optical waveguide system wherein with the backscattering control in accordance with the present disclosure may include planar optical waveguides, such as those that could be formed on semiconductor or dielectric substrates, such as SOI or glass, and/or non-planar optical waveguides, such as optical fibers. The input light received by the optical waveguide systems described therein may include light of one or more polarizations, and the systems may be configured to suppress light in one of the received polarizations and in all of the received polarizations. For example, in some embodiments the filters 165 in the waveguide system of FIG. 6 may be replaced by a polarizer or a polarization controller so as to enable controlling the back-scattering signal of a selected polarization. Furthermore, some embodiments may include an optical local oscillator source and an optical mixer disposed prior to the monitoring PD for mixing the back-scattered light with the light from the optical local oscillator source.

Although the theoretical description given herein is thought to be correct, the operation of the devices described and claimed herein does not depend upon the accuracy or validity of the theoretical description. That is, later theoretical developments that may explain the observed results on a basis different from the theory presented herein will not detract from the inventions described herein.

While the present invention has been particularly shown and described with reference to the preferred mode as illustrated in the drawing, it will be understood by one skilled in the art that various changes in detail may be affected therein without departing from the spirit and scope of the invention as defined by the claims.

We claim:

1. A method for controlling back scattering in an optical waveguide system comprising at least one optical waveguide having an input port, said at least one optical waveguide defining an optical waveguide path for light injected in the input port, the method comprising:
   a) injecting input light into the input port of the at least one optical waveguide, the input light partially converting into backscattered light as the input light propagates away from the input port in the at least one optical waveguide, the back scattered light propagating towards the input port;
   b) tapping off a portion of the back scattered light to form first tapped-off light;
   c) coupling the first tapped-off light into a first photodetector (PD);
   d) measuring a first electrical PD signal from the first PD, said first electrical PD signal being responsive to the first tapped-off light received by the first PD; and,
   e) acting on the at least one waveguide so as to vary an optical phase of the backscattered light at one or more waveguide locations along the at least one optical waveguide in dependence upon the first electrical PD signal, or a signal derived at least in part therefrom, so as to control an optical power of the tapped off portion of the backscattered light.

2. The method of claim 1, wherein e) comprises adjusting a temperature of at least a portion of the at least one optical waveguide in dependence upon the first electrical PD signal.

3. The method of claim 1, including measuring a return optical loss of the optical waveguide system at an operating wavelength based at least in part upon the first electrical PD signal, wherein e) comprises adjusting the optical phase of the backscattered light at the one or more waveguide locations so as to reduce the return optical loss at the operating wavelength.

4. The method of claim 1 wherein the at least one optical waveguide comprises a first waveguide section and a second waveguide section optically connected in sequence with the first waveguide section, and wherein e) comprises changing the optical phase of the backscattered light between the first waveguide section and the second waveguide section.

5. The method of claim 1 wherein the acting comprises locally varying a refractive index of the at least one optical waveguide at the one or more waveguide locations.

6. The method of claim 5 wherein b) comprises tapping off the portion of the back scattered light to form first tapped-off light at or near the input port, and wherein e) comprises varying the optical phase of the backscattered light in dependence at least in part upon the first electrical PD signal so as to decrease, or at least stabilize, the optical power of the backscattered light at the input port.

7. The method of claim 5 wherein the acting comprises one of:
   responsive to the first electrical PD signal, variably applying an electrical voltage or current to the at least one optical waveguide at the one or more waveguide locations so as to vary a refractive index of the optical waveguide at said location or locations, or
   responsive to the first electrical PD signal, variably heating the at least one optical waveguide at the one or more waveguide locations so as to vary a refractive index of the optical waveguide at said location or locations.

8. The method of claim 1 comprising providing a plurality of tunable local phase shifters disposed at a plurality of locations in the optical waveguide path, wherein the acting comprises selecting a first subset of the tunable local phase shifters for tuning in dependence upon the first electrical PD signal when the input light comprises a first operating wavelength, and selecting a second subset of the tunable local phase shifters for tuning in dependence upon the first electrical PD signal when the input light comprises a second operating wavelength that is different from the first wavelength, wherein the second subset is different from the first subset.

9. The method of claim 1 for controlling the back scattering in a selected wavelength range, further comprising blocking wavelengths of the backscattered light outside of the selected wavelength range from coupling into the first PD.

10. An optical waveguide system comprising:
    an input port configured to receive input light;
    at least one optical waveguide disposed to guide the input light from the input port along an optical waveguide path, the input light being partially converted into backscattered light while propagating in the at least one optical waveguide, the back scattered light propagating towards the input port;
    a first photodetector (PD) configured to provide a first electrical PD signal responsive to light received by the first PD;
    a coupler disposed to tap off a portion of the backscattered light and configured to couple said portion into the first PD;
    at least one optical phase tuner configured to act upon the at least one optical waveguide so as to vary an optical phase of light propagating therein at one or more locations along the at least one optical waveguide in response to one or more electrical control signals, so as to control an optical power of the tapped off portion of the backscattered light; and,
    a controller electrically connected to the first PD and the optical phase tuner and configured to adjust the one or more electrical control signals so as to minimize or at least decrease the first electrical PD signal or a signal derived at least in part therefrom.

11. The optical waveguide system of claim 10, wherein the at least one optical phase tuner comprises a temperature control element disposed to be in thermal contact with at least a middle length portion of the at least one optical waveguide, the temperature control element configured to vary a temperature in the waveguide in response to the one or more electrical control signals and comprising one of an electric heater and a thermo-electric cooler (TEC).

12. The optical waveguide system of claim 10, wherein the one or more optical phase tuners comprise one or more tunable local phase shifters disposed at the one or more waveguide locations and configured to selectively shift an optical phase of light propagating in the waveguide at said waveguide location or locations in response to the one or more electrical control signals, wherein said one or more waveguide locations are selected so as to enable at least 3 dB variation of the optical power of the tapped-off portion of the back-scattered light by varying the optical phase of the backscattered light at said location or locations.

13. The optical waveguide system of claim 10 wherein the coupler is disposed at or near the input port and comprises one of a directional waveguide coupler, a multi-mode waveguide coupler, and a micro-ring resonator.

14. The optical waveguide system of claim 12 wherein the one or more tunable local phase shifters comprises at least one of:
- one or more electrical resistive heating elements disposed to locally heat the at least one optical waveguide at the one or more waveguide locations;
- one or more p/n junctions disposed at the one or more waveguide locations and configured to change the concentration of electrical charge carriers in a portion of the at least one optical waveguide; and,
- one or more electrodes disposed to apply voltage across the at least one optical waveguide at the one or more waveguide locations.

15. The optical waveguide system of claim 10 further comprising an optical filter disposed in an optical path of the tapped-off portion of the backscattered light so as to block optical frequencies outside of a selected frequency range from reaching the first PD.

16. The optical waveguide system of claim 12 wherein the at least one optical waveguide comprises a first waveguide section and a second waveguide section optically connected in sequence with the first waveguide section, and wherein the one or more tunable local phase shifters comprise a first tunable local phase shifter disposed optically between the first waveguide section and the second waveguide section.

17. The optical waveguide system of claim 16 wherein at least one of the first waveguide section and the second waveguide section comprises an optical waveguide device selected from a list consisting of: a Mach-Zehnder waveguide interferometer, an optical waveguide modulator, a micro-ring resonator, a directional coupler, a multi-mode coupler, an array waveguide grating, an optical polarizer, an optical filter.

18. The optical waveguide system of claim 10 wherein the at least one optical waveguide forms a planar lightwave circuit (PLC) implemented with one or more optical chips.

19. The optical waveguide system of claim 10 further comprising a second PD disposed to receive a fraction of input light, wherein the controller is configured to measure the return optical loss of the optical waveguide system, and to vary the one or more electrical control signals so as to minimize, reduce, or stabilize the return optical loss.

* * * * *